July 30, 1963      K. D. LANTZ      3,099,112
MACHINE FOR HONING THE FLANKS OF GEAR TEETH
Filed Aug. 11, 1961
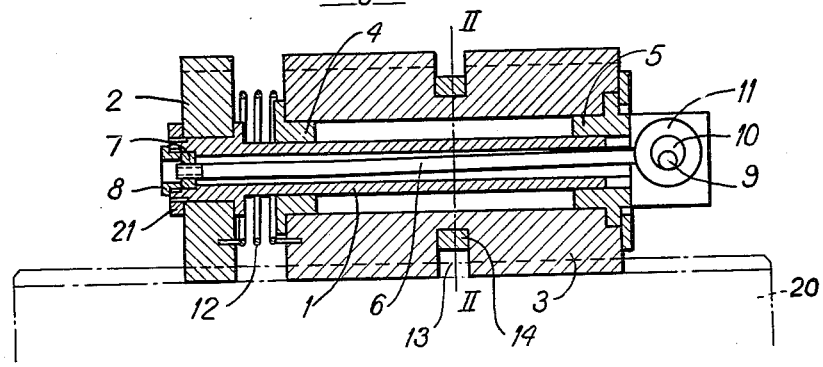
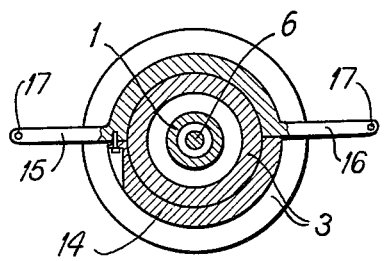
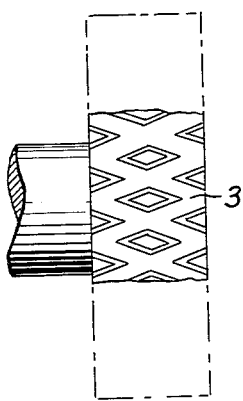
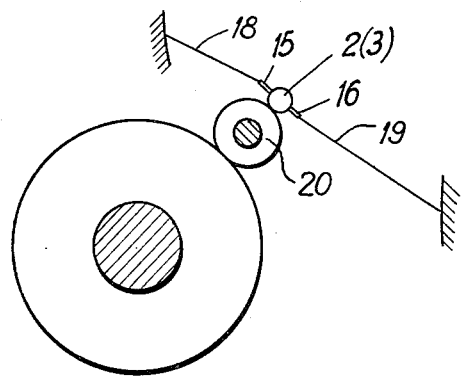
Inventor
Kurt David Lantz
by Sommers & Young
Attorneys 3,099,112
MACHINE FOR HONING THE FLANKS OF
GEAR TEETH
Kurt D. Lantz, Nacka, near Stockholm, Sweden, assignor to Turbin Aktiebolaget de Laval-Ljungstrom, Finspong, Sweden
Filed Aug. 11, 1961, Ser. No. 130,824
Claims priority, application Sweden Aug. 13, 1960
4 Claims. (Cl. 51—48)

The present invention relates to a machine for honing the flanks of gear teeth.

The object of the invention is to provide a machine of this kind which may correct with high precision uneven contact appearing between interengaging gear teeth during operation.

Another object is to provide a portable machine of said kind allowing its use, for instance, for honing the teeth of ship propulsion gears. In such a use the entire honing operation, including removal and replacement of gear housings, can usually be completed in 10 to 15 hours, that is to say, during the interval required for a ship to discharge or load its cargo.

According to a feature of the invention the honing machine under consideration comprises two toothed wheels mounted in axially spaced relation to each other on a common shaft which are adapted during the honing operation to engage the teeth to be honed, one of said wheels being the honing wheel proper and the other being a guide-wheel therefor.

According to another feature of the invention the said toothed wheels are rotatable with relation to each other and connected together by a spring or similar means for adjusting the contact between the gear teeth undergoing honing and the teeth of the honing wheel acting thereon.

According to a further feature of the invention the honing wheel in order to perform its action is set into a rapid axial oscillation and a simultaneous slow rotation.

Other features will appear from the following description, reference being had to the accompanying drawing, in which:

FIG. 1 is an axial section of a machine embodying the invention;

FIG. 1a is a side view of a guide-wheel of FIG. 1, illustrating its surface formation;

FIG. 2 is a cross section taken along the line II—II of FIG. 1, and

FIG. 3 is a schematic view showing the use of the machine for honing the teeth of the pinion of, say, a spur gear.

In the drawing the reference numeral 1 designates a tubular shaft. Mounted on shaft 1 are two axially spaced toothed wheels, viz. a honing wheel 2 made, for instance, from a suitable synthetic resin and a guide-wheel 3. The former is mounted on a bearing surface at one end of the shaft and held against axial displacement thereon between a rigid flange on the shaft and a ring nut 21 screwed onto a threaded projecting end portion of the shaft. The guide-wheel 3 which is a greater axial length than the honing wheel 2 is rotatably mounted on bearing surfaces of two bushings 4 and 5 slidably mounted on the shaft.

Extending through the entire length of the tubular shaft 1 is a rod 6 one end of which is threaded and carries a nut 7 held clamped against an inner shoulder of shaft 1 by means of a threaded stop member 8 engaging internal threads of the end-piece of the shaft carrying the ring nut 21. The other end of the rod 6 is in operable connection with an eccentric 10 on a driving shaft 9 by means of a ring 11 loosely surrounding the eccentric. Thus, upon the rotation of shaft 9 the rod 6 and the shaft 1 together with the honing wheel 2 will be set in a rapid axial oscillation. The rotation of shaft 9 may be effected by an electric, air-driven or other suitable kind of motor, not shown.

A coiled spring 12 surrounding shaft 1 in the axial space between the toothed wheels 2 and 3 is connected by its ends to said wheels as shown.

An annular groove 13 formed in the toothed wheel 3 at a point substantially midway between its ends contains a ring 13 which for mounting reasons comprises two half cylindric parts. Said ring 14 is provided with two diametrically projecting arms 15 and 16, respectively, formed with holes near its ends to allow ropes or the like hereinafter referred to as "lines," to be fastened to the arms, as indicated at 18 and 19, respectively, in FIG. 3.

When the machine is to be used it is rigged onto the gear teeth of which are to be honed, as for instance, a pinion 20 as shown in FIG. 3. The machine rests with its weight acting on the pinion, with both toothed wheels 2 and 3 engaging the teeth of the pinion.

The lines 18 and 19 prevent the machine from rolling off the pinion.

To force honing wheel 2 with sufficient power against the tooth flanks of pinion 20 the wheels 2 and 3 are turned to a slight degree in opposite directions, tensioning spring 12. Then the machine is brought to bear on pinion 20, with its teeth engaging the pinion teeth, and rigged securely by means of the lines 18 and 19. Spring 12 tends to expand, thereby forcing the teeth of wheel 2 against the pinion tooth flanks. By rotation of shaft 9 the rod 6 and the wheel 2 are caused to oscillate axially thus performing the honing operation.

By slow rotation of the pinion 20, as by means of a turning gear, the wheels 2 and 3 are caused to rotate slowly.

It is to be noted that the teeth of wheels 2 and 3 are designed to mate with the pinion teeth.

Wheel 3, in order that it may accommodate both right and left hand helical gears, may be formed with helical gear teeth of opposite hand as indicated in FIG. 1a.

It is further to be noted that the honing wheel 2 may be easily replaced after unscrewing the ring nut 21.

I claim:

1. A machine for honing the flanks of gear teeth comprising in combination, a shaft, a toothed honing wheel and a toothed guide wheel mounted in axially spaced relation on said shaft for engaging the teeth to be honed, means for causing the toothed wheels to perform rotational and axial movements with relation to each other, means yieldingly interconnecting said toothed wheels for adjusting the contact between the gear teeth undergoing honing and the teeth of the honing wheel as result of a mutual rotational movement of the toothed wheels, and means for imparting an axial oscillation to the honing wheel while allowing a common turning of the honing wheel and the guide wheel under the control of a rotary gear engaged thereby.

2. In a machine as claimed in claim 1 and in which the shaft carrying the toothed wheels is hollow, the further feature that the means for imparting an axial oscillation to the honing wheel comprises a rod extending through the length of the hollow shaft and connected at one end to said shaft and at the other end to an eccentric driven by an external source of power.

3. A machine as claimed in claim 1, in which the guide wheel is formed with helical teeth of opposite hand, crossing each other.

4. A machine for honing the flanks of gear teeth comprising in combination, a hollow shaft, a toothed honing wheel rigidly mounted thereon, a toothed guide wheel rotatably and slidably mounted on said shaft in axially spaced relation to the honing wheel, a coiled spring surrounding the shaft in the space between the toothed wheels for yieldingly holding them against mutual rotation, means in engagement with the guide wheel for holding the guide wheel against axial movement when in engagement with the teeth of a gear undergoing honing while permitting rotation of the guide wheel, and means for imparting an axial oscillation of the honing wheel with relation to the guide wheel.

References Cited in the file of this patent
UNITED STATES PATENTS
1,562,438    Copland _____ Nov. 24, 1925